(12) United States Patent
Kim

(10) Patent No.: US 6,392,719 B2
(45) Date of Patent: May 21, 2002

(54) LIQUID CRYSTAL DISPLAY DEVICE

(75) Inventor: Jeom Jae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/083,980

(22) Filed: May 26, 1998

(30) Foreign Application Priority Data

Nov. 5, 1997 (KR) .......................................... 97/58154

(51) Int. Cl.[7] .......................... G02F 1/1333; G02F 1/13
(52) U.S. Cl. .............................. 349/40; 349/54; 349/192
(58) Field of Search .......................... 349/40, 192, 54; 257/48, 59, 72, 350

(56) References Cited

U.S. PATENT DOCUMENTS

| | | | |
|---|---|---|---|
| 5,668,032 A | * | 9/1997 | Holmberg et al. .......... 438/144 |
| 5,859,679 A | * | 1/1999 | Song .......................... 349/54 |
| 6,014,191 A | * | 1/2000 | Kim et al. .................... 349/54 |
| 6,111,621 A | * | 8/2000 | Kim et al. .................... 349/54 |

FOREIGN PATENT DOCUMENTS

| | | | |
|---|---|---|---|
| JP | 5-333329 | * | 12/1993 |
| JP | 8-201843 | * | 8/1996 |

* cited by examiner

*Primary Examiner*—William L. Sikes
*Assistant Examiner*—Tarifur R. Chowdhury
(74) *Attorney, Agent, or Firm*—Morgan, Lewis & Bockius LLP

(57) ABSTRACT

A liquid crystal display (LCD) device that includes a plurality of gate lines formed at predetermined intervals in one direction and a plurality of data lines formed at predetermined intervals in a direction perpendicular to the plurality of gate lines. The LCD display device also includes a first shorting bar connected to (3n-2)th numbered data lines of the plurality of data lines, a second shorting bar connected to (3n-1)th numbered data lines of the plurality of data lines, and a third shorting bar connected to (3n)th numbered data lines of the plurality of data lines.

12 Claims, 5 Drawing Sheets

LIQUID CRYSTAL DISPLAY DEVICE

This application claims the benefit of Application No. 58154/1997, filed in Korea on Nov. 5, 1997, which is hereby incorporated by reference.

BACKGROUND OF THE INVENTION

1. Field of the Invention

The present invention relates to a liquid crystal display (LCD) device and more particularly, to an LCD device in which a shorting bar of a data line is divided to improve accuracy in testing and measuring a cell.

2. Discussion of the Related Art

Generally, in the fabricating process steps of an LCD device, undesired static electricity is produced and subsequently is applied to the inside of a thin film transistor TFT-LCD array. The discharging of the static electricity can destroy a device such as a TFT. To prevent the inner device from being destroyed by static electricity discharge and also to facilitate TFT-LCD array testing, after formation of the TFT-LCD array, a shorting bar is utilized.

A conventional LCD device including a shorting bar will now be described with respect to the accompanying drawings.

FIG. 1 is a schematic layout of a conventional LCD device. FIG. 2 is a schematic layout illustrating an interconnection relationship between a data line and a shorting bar of FIG. 1.

The conventional TFT-LCD array, as shown in FIG. 1, includes a plurality of gate lines 1a and 1b formed at predetermined intervals in one direction and a plurality of data lines 2a and 2b formed at predetermined intervals in a direction perpendicular to the plurality of gate lines 1a and 1b.

As shown in FIG. 1, a pixel electrode (not shown) is formed at each pixel region where the gate lines 1a and 1b cross the data lines 2a and 2b. A TFT 3 is formed, at each line and gate crossing and applies picture signals of the data lines 2a and 2b to the pixel electrode. The picture signals correspond to driving signals of the gate lines 1a and 1b.

A plurality of shorting bars 4, 5, 6, and 7 are formed around the TFT-LCD array. The plurality of gate lines 1a and 1b and the plurality of data lines 2a and 2b are divided into even and odd numbered lines. The first shorting bar 6 is connected to each of the data lines 2a, and are designated as the even numbered data lines. The second shorting bar 7 is connected to each of the data lines 2b and are designated as the odd numbered data lines. The third shorting bar 4 is connected to the gate lines 1a which are designated as the even numbered gate lines. The fourth shorting bar 5 is connected to the gate lines 1b which are designated as the odd numbered gate lines.

The interconnection relationship between the data lines 2a and 2b and the shorting bars 6 and 7, of the LCD device of FIG. 1, will now be described with reference to FIG. 2.

As shown in FIG. 2, the first shorting bar 6 is integrally formed with the data line 2a and is composed of the same material as data lines 2a and 2b. Similarly (although not shown), the second shorting bar 7 is composed of the same material as gate lines 1a and 1b and is integrally formed with gate lines 1a and 1b. The second shorting bar 7 and the data line 2b are connected to each other by a transparent electrode 9.

The shorting bars 4, 5, 6, and 7 in the conventional LCD device are used to prevent an inner device from being destroyed because of an electro-static discharge. Static electricity is produced during the course of manufacture of the TFT-LCD array and during the testing of the TFT-LCD array to determine whether or not the gate lines and the data lines have been shorted out. The testing is accomplished by maintaining an equipotential voltage between the data lines.

In other words, a power source is applied to the shorting bars which are connected to one end of each of the gate lines, the other end of each of the gate line is then checked to determine whether or not the gate lines are shorted out. In a similar manner, as employed for the gate lines, the data lines are tested to determine whether or not the data lines are shorted out.

The shorting bars are not an active element of the TFT-LCD array. The shorting bars are only used in testing the TFT-LCD. array and the prevention of destructive discharges of accumulated static electricity. After forming the TFT-LCD array and testing the same, an upper plate and lower plate of the TFT-LCD are adhered to each other. The shorting bars are then removed by scribing and grinding processes.

The conventional LCD device has several problems. Since the gate lines 1a and 1b and the data lines 2a and 2b are divided into odd numbered lines and even numbered lines, respectively, and the shorting bars are formed at each of the gate lines and data lines to test the TFT-LCD array and prevent the destructive discharge of static electricity, respectively, it is difficult to check characteristics of the R (Red), G (Green), and B (Blue) colors when testing the TFT-LCD array. In other words, since the shorting bar is formed by dividing each of the data lines, it is difficult to separately check the characteristics of each of the R, G, and B colors.

Furthermore, the first shorting bar 6 is integrally formed with the data line and is formed of the same material as the data line. The second shorting bar 7 is formed of the same material as the gate line and connected to the data line by means of the transparent electrode 9. With this configuration, it is likely that if a poor image occurs it is probably due to resistance differences between the first shorting bar 6 and the data line and between the second shorting bar 7 and the data line.

SUMMARY OF THE INVENTION

Accordingly, the present invention is directed to an LCD device that substantially obviates one or more of the problems due to limitations and disadvantages of the related art.

An object of the present invention is to provide an LCD device which reduces damage due to a destructive discharge of static electricity, which occurs in the course of manufacturing, and testing of a TFT-LCD array.

A further object of the present invention is to improve the accuracy of cell testing by dividing a shorting bar of a data line into three segments.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an LCD device according to the present invention includes a plurality of gate lines formed at predetermined intervals in one direction, a plurality of data lines formed at predetermined interval in a direction perpendicular to the plurality of gate lines, a first shorting bar connected to (3n-2)th data lines of the plurality of data lines, a second shorting bar connected to (3n-1)th data lines of the plurality of data lines wherein n is a natural number, and the first and third shorting bars are adapted to prevent static electricity, and a third shooting bar connected to (3n)th data lines of the plurality of data lines.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

An LCD device according to the first embodiment of the present invention will now be described in detail with reference to FIG. 3 and FIG. 4.

Figure 1:
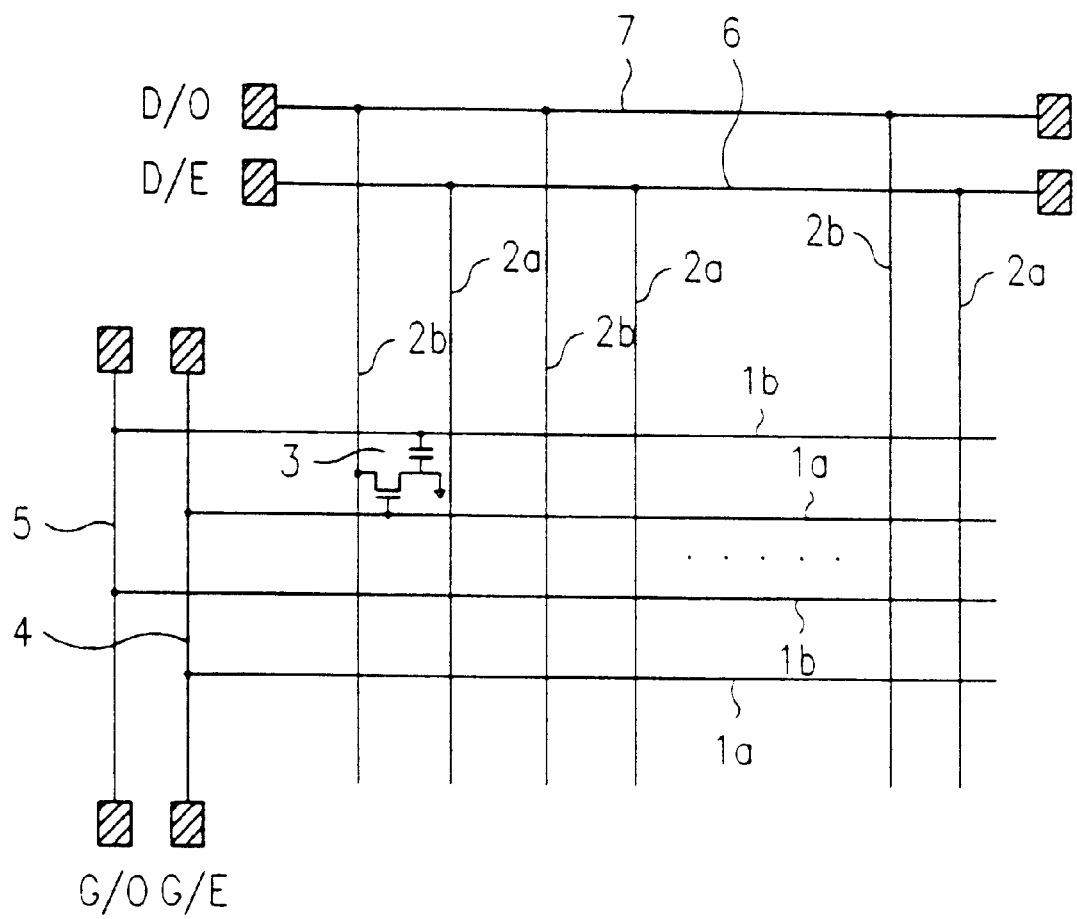
FIG. 1 is a schematic layout of a conventional LCD.
Figure 2:
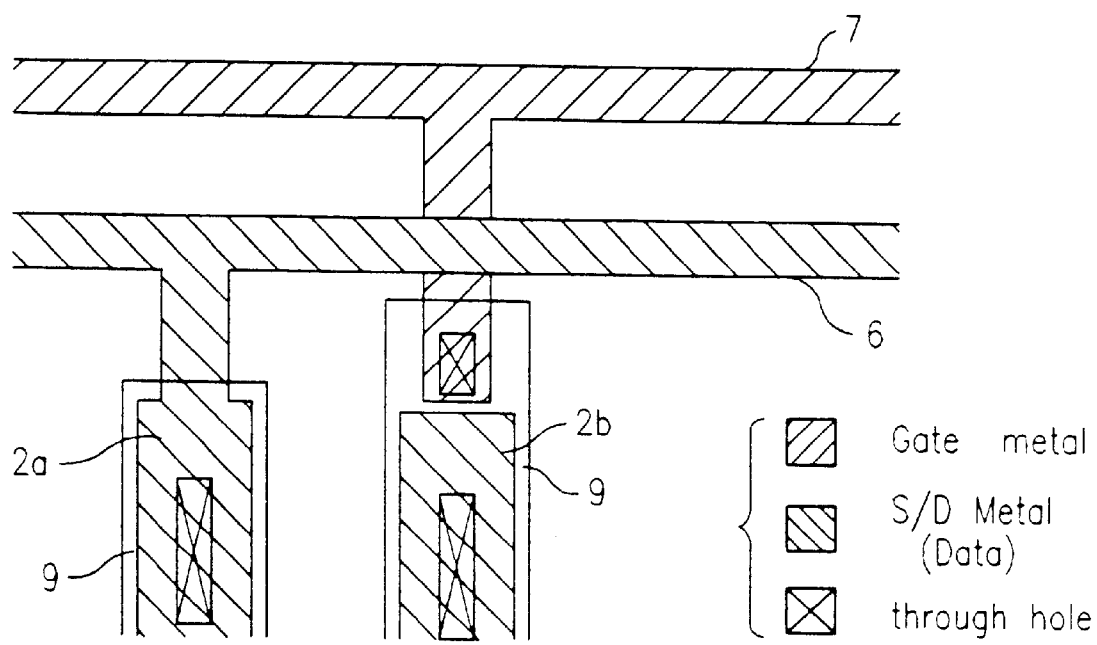
FIG. 2 is an overhead view of a layout of an interconnection relationship between each data line and each shorting bar in the conventional LCD device of FIG. 1.
Figure 3:
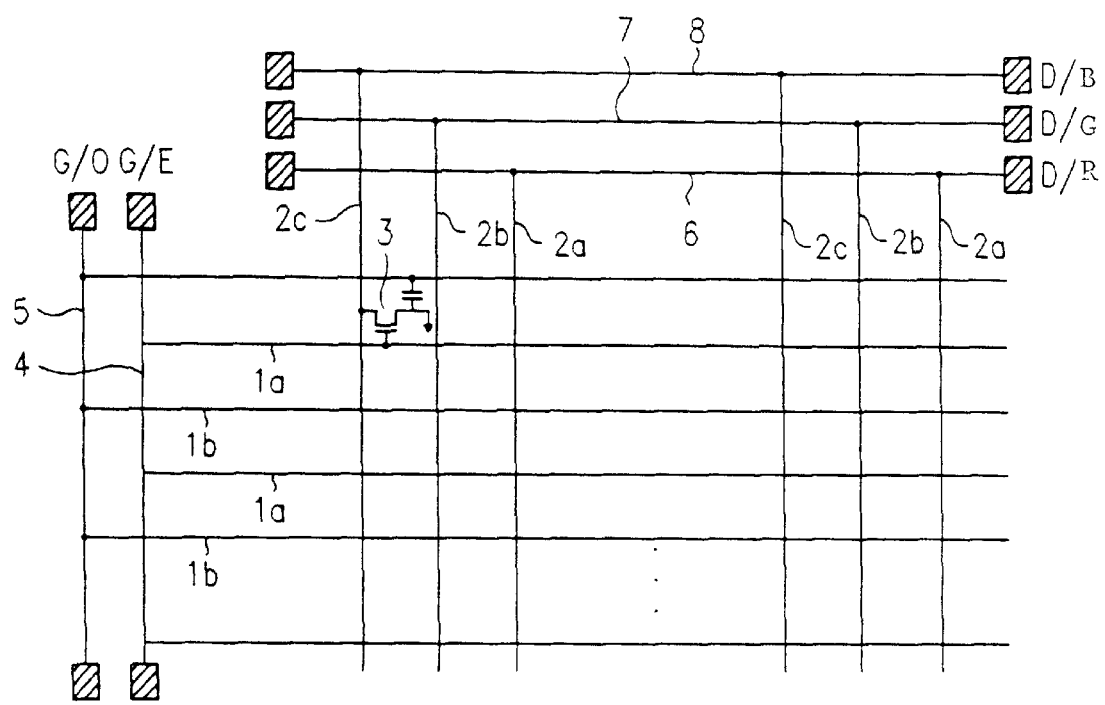
FIG. 3 is a schematic layout of an LCD device according to the first embodiment of the present invention.
Figure 4:
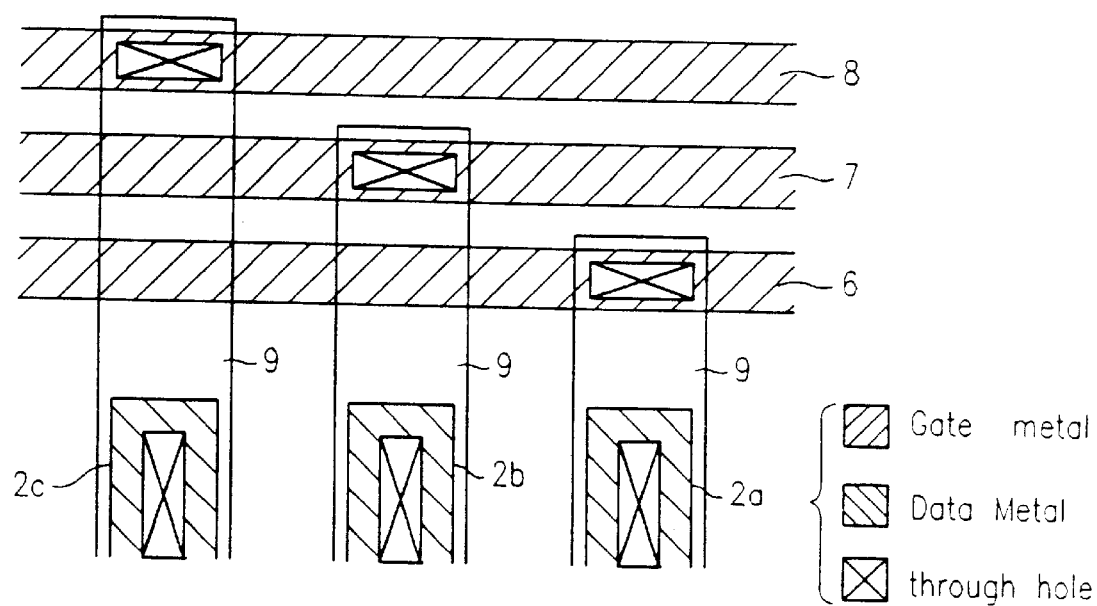
FIG. 4 is an overhead view of a layout of an interconnection relationship between each data line and each shorting bar in the LCD device of FIG. 3.

As shown in FIG. 3, a TFT-LCD array in the LCD device of the first embodiment includes a plurality of gate lines 1$a$ and 1$b$ formed at predetermined intervals in one direction and a plurality of data lines 2$a$, 2$b$, and 2$c$ formed at predetermined intervals in a direction perpendicular to the plurality of gate lines 1$a$ and 1$b$.

A pixel electrode (not shown) and a TFT 3 are formed in each pixel region, which corresponds to where each of the gate lines 1$a$ and 1$b$ cross each of the data lines 2$a$, 2$b$, and 2$c$. The TFT 3 applies picture signals of the data lines 2$a$, 2$b$, and 2$c$ to the pixel electrodes corresponding to driving signals of the gate lines 1$a$ and 1$b$.

A plurality of shorting bars 4, 5, 6, 7, and 8 are formed around the TFT-LCD array. The plurality of gate lines 1$a$ and 1$b$ are divided into even and odd numbered gate lines. The plurality of data lines 2$a$, 2$b$, and 2$c$ are divided into each of a R, G, and B color. The first shorting bar 6 is supplied with a R color signal and is connected to (3n-2)th (n=1, 2, 3, . . . , where n is a natural number), data lines that correspond to the data lines 2$a$. The second shorting bar 7 is supplied with a G color signal, and is connected to (3n-1)th data lines that correspond to the data lines 2$b$. The third shorting bar 8 is supplied with a B color signal, is connected to (3n)th data lines that corresponds to the data lines 2$c$. The fourth shorting bar 4 is connected to the gate lines 1$a$ of the even numbered gate lines. The fifth shorting bar 5 is connected to the gate lines 1$b$ of the odd numbered gate lines.

For example, in a TFT-LCD array, shorting bar 6 would be connected to the 1st, 4th, 7th, . . . data lines; shorting bar 7 would be connected to the 2nd, 5th, 8th, . . . data lines; and shorting bar 8 would be connected to the 3rd, 6th, 9th, . . . data lines.

An interconnection relationship between each of the data lines 2$a$, 2$b$, and 2$c$ and each of the first, second, and third shorting bars 6, 7, and 8, respectively, will now be described with reference to FIG. 4.

The first, second, and third shorting bars 6, 7, and 8 are, formed simultaneously with the forming of the gate lines 1$a$ and 1$b$ and are composed of the same materials as the gate lines 1$a$ and 1$b$. The data lines 2$a$, 2$b$, and 2$c$ and the first, second, and third shorting bars 6, 7, and 8 are respectively connected with one another by transparent electrodes 9 when forming the pixel electrode. The transparent electrodes 9 are formed of the same materials as the pixel electrode (not shown).

Figure 5:
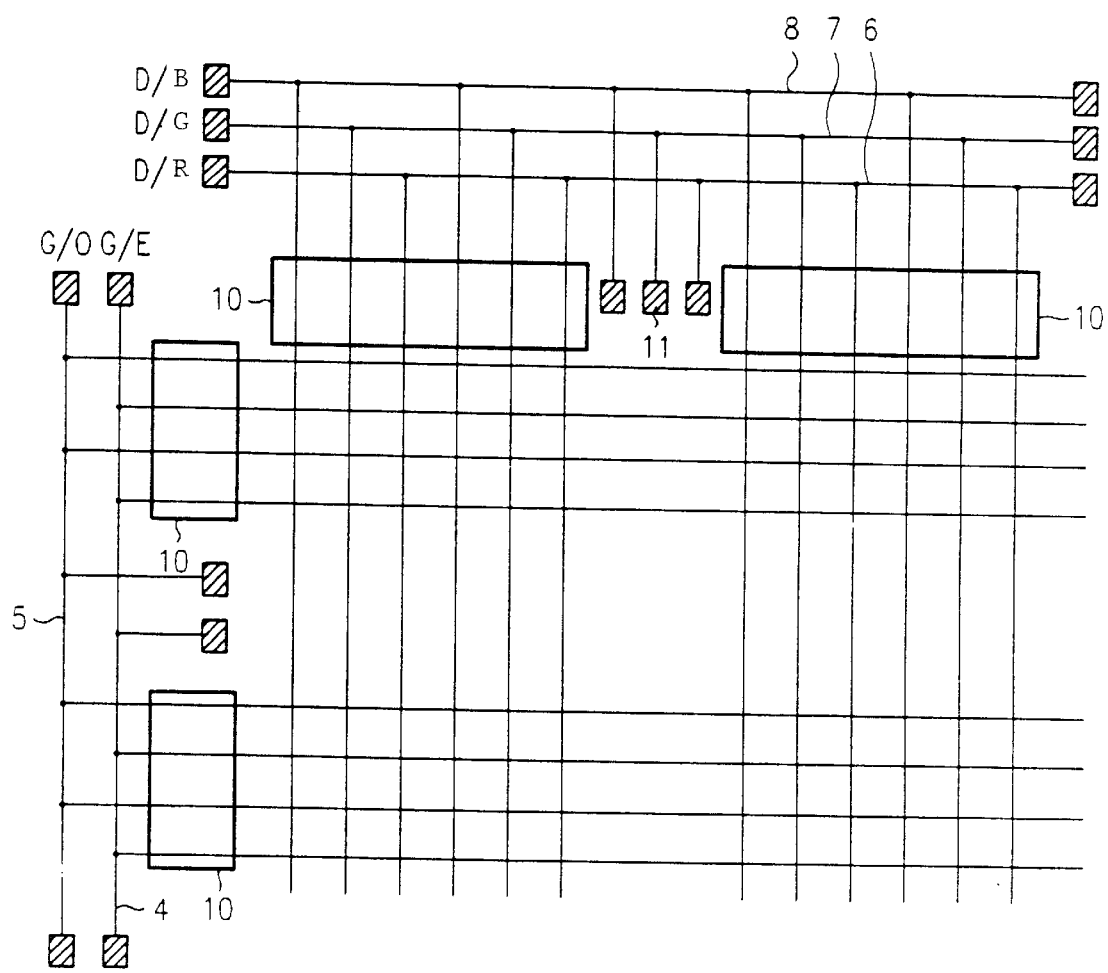
FIG. 5 is a schematic layout of an LCD device according to a second embodiment of the present invention.

FIG. 5 is a schematic layout of an LCD device according to the second embodiment of the present invention.

In the LCD device, according to the second embodiment of the present invention, it is intended that the TFT-LCD array is separately tested even if the shorting bars are shorted out in the course of the manufacturing process.

In other words, auxiliary test pads 11 are formed between a bundle of pads 10 formed in the data lines to apply signals to the shorting bars when testing the TFT-LCD array so that the auxiliary test pads 11 are connected to the first, second, and third shorting bars 6, 7, and 8, respectively. Thus, it is possible to test shorting out of the signal lines of the gate lines or the data lines even if the shorting bars are shorted out.

The aforementioned LCD device of the present invention has, the following advantages.

Since the shorting bars of the data lines are divided into three segments, it is possible to operate a cell independently for each of the R, G, and B colors in testing and measuring the cell, thereby improving accuracy of cell tests and measurements.

Furthermore, since all the shorting bars of the data lines are formed simultaneously with the patterning of the gate lines and connected with the data lines by means of the transparent electrode, the resistances between each of the shorting bars and each of the data lines is substantially equal to one another. The second embodiment is capable of reducing any difference between pictures applied to the cell, which may occur during testing of the cell.

Additionally, since two shorting bars are formed in the gate lines and three shorting bars are formed in the data lines, it is possible to reduce any damage due to electrostatic discharge and increase the yield.

It will be apparent to those skilled in the art that various modifications and variations can be made in the LCD device according to the present invention without departing from the spirit or scope of the invention. Thus, it is intended that the present invention cover the modifications and variations of the invention provided they come within the scope of the appended claims and their equivalents.

What is claimed is:

1. A liquid crystal display (LCD) device comprising:
   a substrate:

a plurality of gate lines formed on the substrate at predetermined intervals in one direction;

a plurality of data lines formed on the substrate at predetermined intervals in a direction perpendicular to the plurality of gate lines;

a first shorting bar formed on the substrate, connected to (3n-2)th numbered data lines of the plurality of data lines, n being a natural number;

a second shorting bar formed on the substrate, connected to (3n-1)th numbered data lines of the plurality of data lines; and a third shorting bar formed on the substrate, connected to (3n)th numbered data lines of the plurality of data lines, wherein the first, second and third shorting bars are adapted to prevent static electricity.

2. The LCD device according to claim 1, further comprising a fourth shorting bar connected to the gate lines of even numbered gate lines and a fifth shorting bar connected to the gate lines of odd numbered gate lines.

3. The LCD device according to claim 2, wherein the first, second, and third shorting bars are composed of the same materials as each of the gate lines, and the data lines and the first, second, and third shorting bars are respectively connected by transparent electrodes.

4. The LCD device according to claim 3, further comprising a plurality of auxiliary test pads connected to the first, second, and third shorting bars and formed between a bundle of pads of the data lines.

5. The LCD device according to claim 1, wherein the first, second, and third shorting bars are composed of the same materials as each of the gate lines, and the data lines and the first, second, and third shorting bars are respectively connected by transparent electrodes.

6. The LCD device according to claim 1, further comprising a plurality of auxiliary test pads connected to the first, second, and third shorting bars and formed between a bundle of pads of the data lines.

7. A TFT substrate comprising:

a substrate;

a plurality of gate lines formed on the substrate at predetermined intervals in one direction;

a plurality of data lines formed on the substrate at predetermined intervals in a direction perpendicular to the plurality of gate lines, the plurality of data lines being numbered consecutively from one side for identification;

a thin film transistor formed on the substrate at each of intersections of the gate lines and the data lines, the thin film transistor being connected to adjacent one of the data lines and adjacent one of the gate lines;

a first shorting bar formed on the substrate, connected to (3n-2)th numbered data lines of the plurality of data lines, n being a natural number;

a second shorting bar formed on the substrate, connected to (3n-1)th numbered data lines of the plurality of data lines; and a third shorting bar formed on substrate, connected to (3n)th numbered data lines of the plurality of data lines, wherein the first, second and third shoring bars are adapted to prevent static electricity.

8. The TFT substrate according to claim 7, wherein the plurality of gate lines are numbered consecutively from one side for identification, the TFT substrate further comprising:

a fourth shorting bar formed on the substrate, connected to the gate lines of even numbered gate lines; and a fifth shorting bar formed on the substrate, connected to the gate lines of odd numbered gate lines, the fourth and fifth shorting bar being adapted to prevent static electricity.

9. The TFT substrate according to claim 8, wherein the first, second, and third shorting bars are composed of the same materials as each of the gate lines, and the data lines and the corresponding first, second, and third shorting bars are respectively connected by transparent electrodes.

10. The TFT substrate according to claim 9, further comprising on the substrate a plurality of auxiliary test pads respectively connected to the first, second, and third shorting bars, the plurality of auxiliary test pads being located at an area that is remote from the ends of the first, second, and third shorting bars so as to enable testing of the TFT substrate even when the first, second, or third shorting bar is disconnected.

11. The TFT substrate according to claim 7, wherein the first, second, and third shorting bars are composed of the same materials as each of the gate lines, and the data lines and the first, second, and third shorting bars are respectively connected by transparent electrodes.

12. The TFT substrate according to claim 7, further comprising on the substrate a plurality of auxiliary test pads respectively connected to the first, second, and third shorting bars, the plurality of auxiliary test pads being located at an area that is remote from the ends of the first, second, and third shorting bars so as to enable testing of the TFT substrate even when the first, second, or third shorting bar is disconnected.

* * * * *